June 19, 1956

C. F. GUNDERSON 2,751,548

RIPPLE COMPENSATOR

Filed Sept. 6, 1951

*INVENTOR.*
CHARLES F. GUNDERSON
BY
Harry M. Saragovitz
*Attorney*

United States Patent Office 2,751,548
Patented June 19, 1956

2,751,548

RIPPLE COMPENSATOR

Charles F. Gunderson, Belmar, N. J.

Application September 6, 1951, Serial No. 245,414

3 Claims. (Cl. 323—22)

(Granted under Title 35, U. S. Code (1952), sec. 266)

The invention described herein may be manufactured and used by or for the Government for governmental purposes, without the payment of any royalty thereon.

This invention is of a means for counteracting the residual alternating current in direct current power supplies and more particularly of a circuit to compensate for ripple voltages in a power supply.

Voltage regulators are well known in the art and usually consist of a series or shunt resistance in connection with the power supply. The series resistance usually comprises a vacuum tube as a variable resistance between the power supply and the load. The resistance is varied to the value required to supply the load with a given voltage within a certain current range. The voltage control is achieved by the I. R. drop within the tube. The shunt regulation usually comprises a vacuum tube whose current is varied out of phase with the variations of the normal circuit load current, or in phase with the voltage variations of the power supply to absorb the fluctuations thereof. The shunt regulator is usually in parallel with the load and there is a series resistor between this and the power supply. The current flow through this resistor, which can be varied to some extent by the tube, determines the voltage at the load.

These systems may effectively compensate for ripple, but they also introduce a considerable loss in voltage and power available to the load. Other types of regulators merely reduce ripple to some extent but do not eliminate it.

It is, therefore, an object of this invention to provide a means for eliminating ripple by adding a voltage of equal and opposite waveform to the ripple to effectively cancel it.

It is a further object of this invention to provide a means for effectively eliminating the ripple voltage in the power supply by injecting a voltage of equal and opposite magnitude to the ripple in the power supply line.

It is a further object of this invention to provide a means for reducing the ripple voltage in a power supply, more effective than conventional filters, and of substantially less weight.

It is a further object of this invention to actively overcome the ripple component of a power supply by controlling a second source of power in a manner intended to overcome the ripple rather than by passively filtering a certain percentage of the ripple component.

Figure 1:
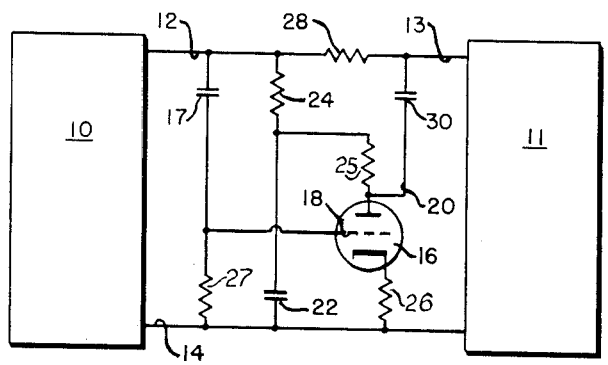
Figure 2:
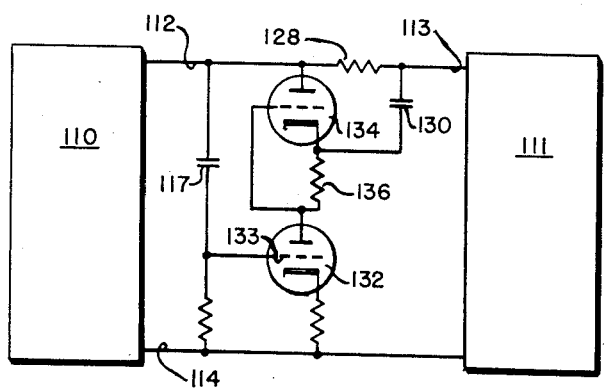
Figure 3:
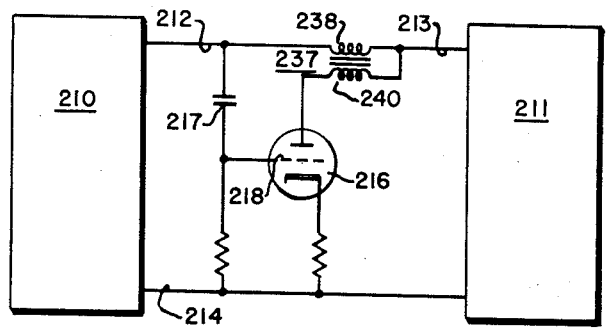

Other and further objects of this invention will become apparent from the following specification and the drawings, in which Figures 1, 2 and 3 show preferred embodiments of this invention.

Referring now more particularly to Fig. 1, a power supply 10 is shown with a ripple compensating circuit across its terminals 12 and 14. The circuit shown here has a vacuum tube 16 having an input 18 of low power to actuate an output 20 of relatively greater power. This tube may be supplied from the line itself but should have a separate source of stored energy such as the condenser 22 which is fed from the power supply through a decoupling resistor 24. Tube 16 is provided with a plate load resistor 25 connected to the junction of resistor 24 and condenser 22. A grid return resistor 27 is also provided, and a cathode load resistor 26 may be utilized in conjunction with the plate load to obtain the desired level of the output voltage at the plate. In operation, the A. C. variation in the power line 12 actuates the grid 18, the vacuum tube 16 which supplies a voltage of equal power and opposite to the A. C. variation. This is applied to the line at point 13 through coupling condenser 30 to compensate for the ripple.

A resistor 28 is included in the main power line between points 12 and 13 to decouple the two opposite signals. Without this resistance the compensating signal at point 13 could never completely neutralize the ripple voltage at 12 since complete neutralization would imply zero A. C. signal at 12 and 13 and zero signal at 12 would not drive the compensating tube 16. The ripple could be greatly reduced by the compensating network, even without the decoupling resistor 28, but since the primary object of this invention is the complete neutralization of ripple, the resistor 28 is shown in the preferred embodiment.

Since the resistor 28 has been included it should be emphasized that this resistor is not comparable to the voltage dropping resistor commonly used in series with a tube, or a constant voltage device, to provide a substantially constant voltage supply. In this latter case, the voltage drop across the resistor is a large percentage of the available voltage, with a corresponding loss of power, whereas the voltage drop across the resistor 28 in applicant's circuit is relatively small. The regulation in applicant's circuit is by means of power added or injected into the supply line by tube 16, while the regulation of the voltage drop devices is accomplished by varying the power losses in the series resistor.

The power required to compensate for the undesired A. C. component in the D. C. power supply across 12 and 14 may be taken from the main power supply 10 as shown in Fig. 1, or it may be taken from a separate power supply (not shown), if there is not enough reserve power in the supply 10. In either case, the power may be stored in condenser 22 as a D. C. potential to supply the tube 16 which changes the D. C. into A. C. of the correct waveform.

The waveform can be taken from the point 12, through condenser 17 to the grid 18 of the tube 16. The output of tube 16 at 20 will have a waveform opposite to that of the input and of a power depending on that of the tube chosen. The output at 20 is applied to the line at 13 to provide a filtered output across 13 and 14 into the load 11.

Another species of this invention is shown in Fig. 2, where elements corresponding to those of Fig. 1 are similarly numbered. In this species the unfiltered power supply 110 feeds terminals 112 and 114 of the ripple compensating system. The filtered output 113—114 feeds the load 111.

In this species, the energy to drive the compensator and be converted into A. C. to counteract the ripple voltage is not drawn continuously from its supply point as is the case in Fig. 1. The energy is stored in condenser 130 which is charged through resistors 128 and 136 and tube 132 on the positive swing of ripple voltage. The tube can be actuated by the positive signal from point 112 through condenser 117 to its grid 133. A negative swing of point 112 drives the grid 133 negative, to cut off the current through the tube 132 and resistor 136 which drives the grid of tube 134 positive to discharge the condenser 130 across resistor 128 to increase the voltage at point 113, or prevent its decrease.

In this circuit, tube 134 will be cut off by the current through condenser 130, while it is charging through resistor 136, but as soon as the condenser is charged some current will flow through tube 134 to supply the control tube 132. A more elaborate control system could be provided here, such as a separate phase inverter tube, to cut off tubes 132 and 134 when they are not performing their specific functions, in order to cut down power losses or more accurately control the compensating voltage. In this case, tube 132 will be conducting only to charge condenser 130, and tube 134 will be conducting only when condenser 130 is being discharged.

Fig. 3 shows a third species of this invention, wherein the energy is stored in a transformer rather than a condenser. In this species the unfiltered power supply 210 has its output across line 212, 214 which connects to the ripple compensator whose output is across 213, 214 to load 211. The ripple compensator comprises tube 216 and transformer 237. The tube may be actuated by the ripple voltage at 212 through condenser 217.

The basic concept here is that the transformer stores up energy during a positive peak of ripple voltage and discharges its stored energy into the line during a negative dip in the ripple voltage. The transformer is controlled by the tube 216. When the positive peak on 212 reaches the grid 218 of tube 216, current is drawn through the primary 240 of the transformer 237. This can lower the voltage at 213 through transformer action to compensate for the positive swing. When the negative peak on 212 reaches the grid 218, the current in the tube decreases, and the flux, built up in the transformer during the positive cycle, breaks down, driving the point 213 positive to compensate for the negative swing.

Other ways of connecting the transformer will be apparent to those skilled in the art.

One of the main purposes of this circuit is to eliminate the necessity of heavy chokes and filter condensers that are required in normal power supplies, particularly those for use with so called high fidelity amplifiers, where very little hum can be tolerated. These compensating circuits can do the work of heavy filters and, in fact, may be superior to them since the choke and condensers filters themselves can only eliminate a part of the ripple and the process is usually one of leaving off the filtering at some arbitrary point where the ripple is considered tolerable, whereas these compensating filters can, in one step, completely eliminate all ripple voltage components of substantially any frequency or wave form. It is noted that chokes and condensers can be used in these compensators but these chokes, or even the transformer of Fig. 3 will be only a fraction of the size and weight and current carrying capacity that would be required of a line filter to carry the full current of the power supply and still have a substantial inductance, since the power required in the ripple compensating components and consumed by them need only be in the order of the power in the ripple itself, which is only a fraction of the power available in a normal D. C. line. These circuits may draw this fraction of power from the line, converting it into an A. C. of equal power to that of the ripple component, as is, of course, necessary to counteract it. The circuits shown here have drawn their power directly from the power line that they are correcting. It is within the scope of this invention and, in fact, would be desirable, if the power supplies were of critical dimensions, to supply these compensating circuits from a separate power source, presumably from the line input of the original A. C. supply voltage. This can easily be done using conventional and readily available small rectifiers, chokes and condensers. In this way, these circuits are completely compatible with existing equipment and can be added where necessary to existing circuits, to perform their functions.

What is claimed is:

1. In combination with a direct current power supply having substantial ripple content at its output terminals, a decoupling impedance having one end connected to the positive output terminal, a first condenser having one end connected to the negative output terminal, the other ends of said impedance and said condenser being connected together, an electron tube having a cathode, an anode, and a control grid, means connecting said cathode to the negative output terminal, a load impedance having one end connected to said anode ad the other end connected intermediate said decoupling impedance and said first condenser, a second condenser connected between said anode and said positive terminal, a third condenser connected between said positive terminal and said grid, and an impedance connecting said grid to said negative terminal, whereby said ripple is applied to said grid and a corresponding output voltage of opposite phase is derived from said anode to cancel said ripple.

2. In the combination of claim 1, a decoupling impedance connecting said second condenser to said third condenser and said positive terminal.

3. A filter circuit for a source of voltage, comprising positive and negative input terminals adapted to be connected to said source, an electron tube having a cathode, an anode, and a control grid, a first condenser connected between said positive terminal and said grid, a first resistor connected between said grid and said negative terminal, second and third resistors connected in series between said positive terminal and said anode, a second condenser connected between the junction of said second and third resistors and said negative terminal, a fourth resistor connected between said cathode and said negative terminal, a third condenser having one end connected to said anode, and a fifth resistor connecting the other end of said third condenser to said positive terminal and said first condenser.

References Cited in the file of this patent

UNITED STATES PATENTS

| | | |
|---|---|---|
| 1,873,952 | Aubort | Aug. 30, 1932 |
| 2,011,442 | Dunn | Aug. 13, 1935 |
| 2,106,793 | Burton | Feb. 1, 1938 |
| 2,270,295 | Harley | Jan. 20, 1942 |
| 2,309,852 | Lewis | Feb. 2, 1943 |
| 2,369,952 | Devine | Feb. 20, 1945 |
| 2,396,507 | Haynes | Mar. 12, 1946 |
| 2,609,446 | Michels | Sept. 2, 1952 |
| 2,629,014 | Edwards | Feb. 17, 1953 |